(12) United States Patent
Ju

(10) Patent No.: US 10,199,676 B2
(45) Date of Patent: Feb. 5, 2019

(54) SECONDARY BATTERY PACK COMPRISING MOVABLE WALL AND ELASTIC MEMBER

(71) Applicant: SK Innovation Co., Ltd., Seoul (KR)

(72) Inventor: Seung-Hoon Ju, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 303 days.

(21) Appl. No.: 15/098,548

(22) Filed: Apr. 14, 2016

(65) Prior Publication Data

US 2016/0308242 A1 Oct. 20, 2016

(30) Foreign Application Priority Data

Apr. 15, 2015 (KR) .................. 10-2015-0053193

(51) Int. Cl.
| | |
|---|---|
| *H01M 10/04* | (2006.01) |
| *H01M 2/02* | (2006.01) |
| *H01M 2/10* | (2006.01) |
| *H01M 2/34* | (2006.01) |
| *H01M 10/052* | (2010.01) |

(52) U.S. Cl.
CPC ..... *H01M 10/0468* (2013.01); *H01M 2/0245* (2013.01); *H01M 2/1016* (2013.01); *H01M 2/345* (2013.01); *H01M 10/0481* (2013.01); *H01M 2/1077* (2013.01); *H01M 10/052* (2013.01); *H01M 2200/20* (2013.01)

(58) Field of Classification Search
CPC ............ H01M 2/02; H01M 2/10; H01M 2/12; H01M 2/1077; H01M 10/04
See application file for complete search history.

(56) References Cited

U.S. PATENT DOCUMENTS

| | | | | |
|---|---|---|---|---|
| 5,364,713 | A | * | 11/1994 | Von Benda ............. H01M 2/22 429/161 |
| 6,218,039 | B1 | | 4/2001 | Mease et al. |
| 7,125,628 | B2 | | 10/2006 | Marukawa et al. |
| 8,846,238 | B2 | | 9/2014 | Jung |
| 2007/0026305 | A1 | * | 2/2007 | Jeon .................... H01M 2/1077 429/159 |
| 2011/0177377 | A1 | | 7/2011 | Dube |
| 2011/0200862 | A1 | | 8/2011 | Kurosawa |
| 2011/0262785 | A1 | | 10/2011 | Johnson et al. |
| 2012/0189879 | A1 | | 7/2012 | Fetzer et al. |
| 2014/0239904 | A1 | | 8/2014 | Tanaka et al. |
| 2015/0340669 | A1 | * | 11/2015 | Aoki ................... H01M 2/1077 429/151 |

FOREIGN PATENT DOCUMENTS

| | | | |
|---|---|---|---|
| EP | 0613201 A1 | 8/1994 | |
| KR | 1020070101025 A | 10/2007 | |
| KR | 1020110075369 A | 7/2011 | |
| KR | 1020110117586 A | 10/2011 | |
| KR | 1020120048280 A | 5/2012 | |
| KR | 101255250 B1 | 4/2013 | |
| WO | WO-2014/125605 A1 * | 8/2014 | .......... H01M 2/1077 |

* cited by examiner

*Primary Examiner* — Kenneth J Douyette
(74) *Attorney, Agent, or Firm* — The Webb Law Firm

(57) ABSTRACT

A secondary battery pack including end plates capable of suppressing a deformation caused by an expansion force of unit cells, a movable wall disposed between at least one end plate and one side face of a unit cell, elastic members disposed between at least one end plate and the movable wall, and connecting bars configured to connect the end plates with each other disposed on both opposite end sides of the at least one unit cell.

11 Claims, 4 Drawing Sheets

10

SECONDARY BATTERY PACK COMPRISING MOVABLE WALL AND ELASTIC MEMBER

CROSS-REFERENCE TO RELATED APPLICATION

This application claims priority to Korean Patent Application No. 10-2015-0053193 filed Apr. 15, 2015, the disclosure of which is hereby incorporated in its entirety by reference.

BACKGROUND OF THE INVENTION

1. Field of the Invention

The present invention relates to a secondary battery pack in embodiments thereof.

2. Description of the Related Art

Among rechargeable secondary batteries, a lithium secondary battery which is most greatly attracting public attention as a next-generation power source has high energy density without a memory effect, and when not in use, the chance of internal current leakage is low, and is very lightweight. Therefore, the lithium secondary battery is widely used in various portable electronic devices such as a notebook computer, a camera, or a mobile phone, as well as, due to characteristics of high energy density, frequency in use thereof tends to be gradually increased in fields such as defense industries, automated systems, automobiles, and aerospace industries. In particular, the lithium secondary battery is widely commercially used as a motor driving source of an electric vehicle and a hybrid vehicle.

Such a lithium secondary battery may be generally classified into a lithium ion battery using a liquid electrolyte and a lithium polymer battery using a polymer electrolyte depending on a type of electrolytic solutions. In addition, such a secondary battery is manufactured in various shapes, and may be classified into cylindrical, prismatic, and pouch shapes depending on a shape thereof.

Further, the lithium secondary battery typically includes: an electrode assembly including a cathode plate in which a cathode active material is coated on a collector, an anode plate in which an anode active material is coated on the collector, and a separation membrane which is disposed between the cathode plate and the anode plate, so as to allow only lithium ions to move therethrough while preventing a short-circuit therebetween; a case which houses the electrode assembly; a electrolytic solution which is contained inside of the case to allow the lithium ions to move; and the like.

In particular, the pouch type lithium secondary battery is significantly lighter than an aluminum case, and has a case made of a pouch packaging material, such that it is possible to have a higher energy density than the prismatic lithium secondary battery.

In such a secondary battery, since a single battery has a low power and a small capacity, when applying to equipment such as an electric vehicle or hybrid vehicle which requires a longer term driving capability and high electrical power, it has been used in a form of a secondary battery module and secondary battery pack in which a plurality of secondary batteries are laminated in the case, and electrically connected with each other, and sensing lines for sensing a voltage and temperature, etc. are included therein.

However, in the secondary battery, a decrease in performance is small even when repeatedly charging and discharging, whereas even if being exposed to abnormal usage environments such as overcharge, short-circuit, reverse connection, or heat exposure, gas is generated due to an electrochemical action in the battery, to increase a battery internal pressure, and thereby the battery may be expanded. Further, if an abnormal operation such as an overcharge is continued for a long time, the electrolyte or the active materials in the battery are decomposed, and the internal pressure and the temperature are rapidly increased, which may result in an explosion or fire of the battery.

Accordingly, a secondary battery pack, in which one or more of unit cells capable of including the secondary battery or a secondary battery module are combined with each other, needs to include: end plates for combining the unit cells without allowing damage due to a pressure generated by the expansion of the battery; a connecting bar for connecting the end plates with each other; and a safety device capable of stopping an operation of the battery pack such as charging of the battery, when the expansion generated in the battery reaches a predetermined value. In addition, as the secondary battery pack is often used in a restricted space, it is necessary to minimize an increase in a size or length while satisfying the above-described requirements.

There are many techniques relating to the secondary battery disclosed in the patent documents such as European Patent Registration No. 0613201 (1998 Aug. 12), U.S. Pat. No. 6,218,039 (2001 Apr. 17), U.S. Pat. No. 7,125,628 (2006 Oct. 24), and U.S. Pat. No. 8,846,238 (2014 Sep. 30), U.S. Patent Application Publication Nos. 2011/0262785 (2011 Oct. 27), 2012/0189879 (2012 Jul. 26), 2014/0239904 (2014 Aug. 28), 2011/0177377 (2011 Jul. 6), and 2011/0200862 (2011 Aug. 18), Korean Patent Laid-Open Publication Nos. 10-2007-0101025 (2007 Oct. 16), 10-2011-0075369 (2011 Jul. 6), 10-2011-0117586 (2011 Oct. 27), and 10-2012-0048280 (2012 May 15), and Korean Patent Registration No. 10-1255250 (2013 Apr. 10).

SUMMARY OF THE INVENTION

An object of the present invention is to provide a secondary battery pack which includes end plates capable of suppressing a deformation caused by an expansion force of unit cells in embodiments thereof.

Another object of the present invention is to provide a secondary battery pack which is capable of suppressing a deformation caused by an expansion force of unit cells, and providing an expansion space of the unit cells while minimizing an increase in a length of the battery pack in embodiments thereof.

In addition, another object of the present invention is to provide a secondary battery pack which includes a movable wall configured to suppress a bending or deformation due to a force generated by expansion of unit cells and an elastic member in embodiments thereof.

Further, another object of the present invention is to provide a secondary battery pack which includes a movable wall configured to maintain a position without deformation during moving by expansion of unit cells and an elastic member in embodiments thereof.

Further, another object of the present invention is to provide a secondary battery pack which is capable of protecting unit cells of the secondary battery pack by operating a switch for stopping an operation of the secondary battery pack with a minimum error, when the expansion of the unit cells reaches a predetermined dangerous level in embodiments thereof.

Furthermore, another object of the present invention is to provide a secondary battery pack which is capable of easily accommodating a change which may be generated by a difference in a dangerous expansion level of the unit cells to be combined as the secondary battery pack in embodiments thereof.

However, the technical problem to be solved by the present invention is limited to the above-described problems, and those skilled in the related art should clearly understand other problems not described above and features of the present invention from the following detailed description.

According to one aspect of the present invention, there is provided a secondary battery pack including at least one unit cell including a secondary battery or a secondary battery module; end plates which are disposed on both opposite end sides of the unit cell; a movable wall which is disposed between the at least one end plate and one side face of the unit cell; an elastic member which is disposed between the at least one end plate and the movable wall to apply a compression force to the one side face of the unit cell through the movable wall; and a connecting bar which is configured to connect the end plates with each other disposed on both opposite end sides of the at least one unit cell, wherein the at least one end plate includes: a convex part which is formed thereon so as to protrude in an opposite direction of the one side face of the unit cell, so that, when the movable wall moves to the end plate due to the unit cell being expanded while pressing the elastic members, the movable wall is housed therein; and a base part which is disposed at a circumference of convex part.

The movable wall may include: a flat plate-shaped body; and one or more hollow column-shaped elastic member insertion protrusions which are formed on a surface facing the at least one end plate of the body, wherein the at least one end plate further includes an additional protruded parts which is formed thereon so as to protrude in the opposite direction of the one side face of the unit cell corresponding to the elastic member insertion protrusions, so that, when the movable wall moves to the at least one end plate due to the unit cell being expanded while pressing the elastic members, the elastic member insertion protrusions are inserted therein, and one end portion of the elastic member is inserted inside of the elastic member insertion protrusion, and the other end portion of the elastic member is positioned in the additional protruded part.

The at least one end plate may further include: a guide member which protrudes from the convex part to the movable wall, wherein the movable wall includes: a flat plate-shaped body; and one or more hollow column-shaped guide member insertion protrusions which are formed on a surface facing the at least one end plate of the body, wherein the guide member is slidably inserted into the guide member insertion protrusions.

The secondary battery pack may further include: a switch which is attached on an outer surface of the at least one end plate, the movable wall includes: a pressing member which is formed on the surface facing the at least one end plate of the body, the at least one end plate includes: a through hole which is formed therein so that, when the movable wall moves to the at least one end plate due to the unit cell being expanded while pressing the elastic members, the pressing member protrudes to an outside of the at least one end plate, wherein the switch is positioned in the at least one end plate so that the pressing member protrudes via the through hole to operate the switch.

The switch may be a non-return type switch.

The pressing member may be disposed at a center of the movable wall, and a plurality of elastic member insertion protrusions or a plurality of guide member insertion protrusions are disposed so as to be point-symmetric about the pressing member.

The pressing member may have a connecting part formed at a free end portion thereof.

The pressing member may be separately connected to the body.

The movable wall may be formed by aluminum die-casting.

The movable wall may have a frame part which is formed on the body thereof in a lattice form and has a larger thickness than the other portions thereof, and the elastic member insertion protrusions or the guide member insertion protrusions are disposed on the frame part.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Hereinafter, specific embodiments of the present invention will be described with reference to the accompanying drawings. But, these are only an example, and the present invention is not limited thereto.

In description of the present invention, detailed description of the publicly known functions and configurations that are judged to be able to make the purport of the present invention unnecessarily obscure are omitted. In addition, terms or words used in the specification and claims should not be construed as limited to a lexical meaning, and should be understood as appropriate notions by the inventor based on that he/she is able to define terms to describe his/her invention in the best way to be seen by others.

However, those skilled in the art will appreciate that such embodiments are provided for illustrative purposes and do not limit subject matters to be protected as disclosed in the detailed description and appended claims. Therefore, it will be apparent to those skilled in the art that various alterations and modifications of the embodiments are possible within the scope and spirit of the present invention and duly included within the range as defined by the appended claims.

Figure 1:
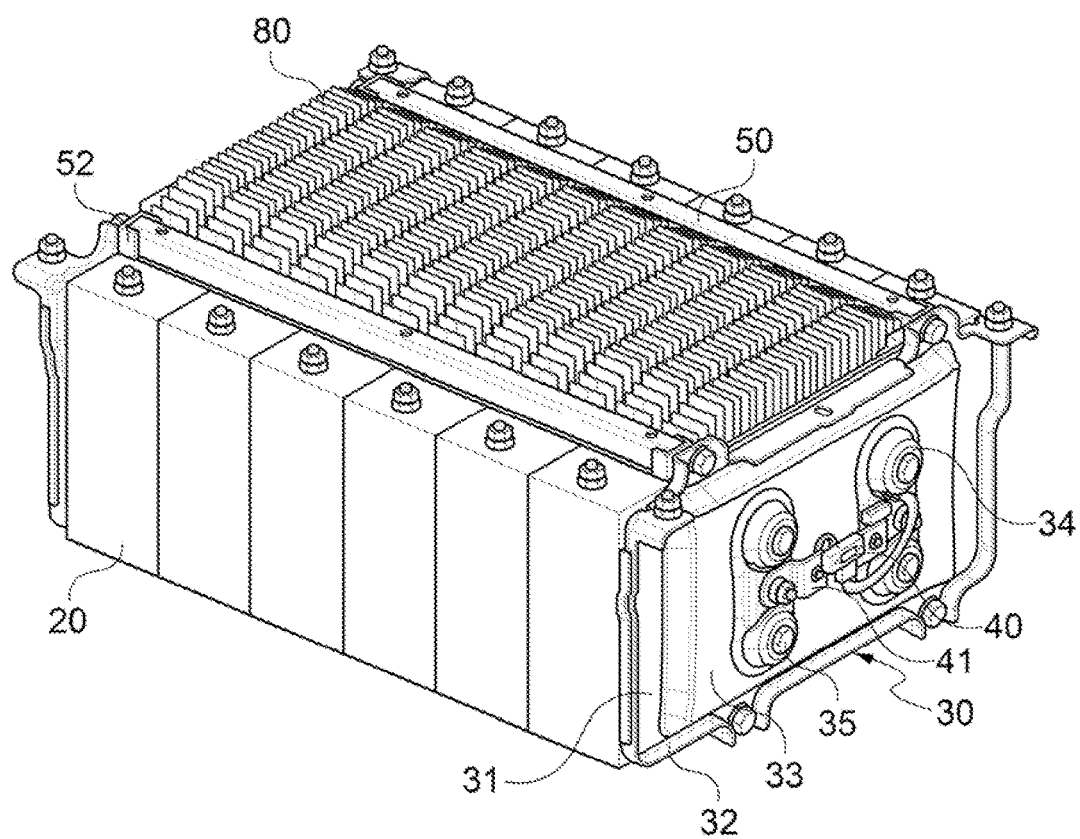
FIG. 1 is a perspective view of a secondary battery pack according to an embodiment of the present invention.
Figure 2:
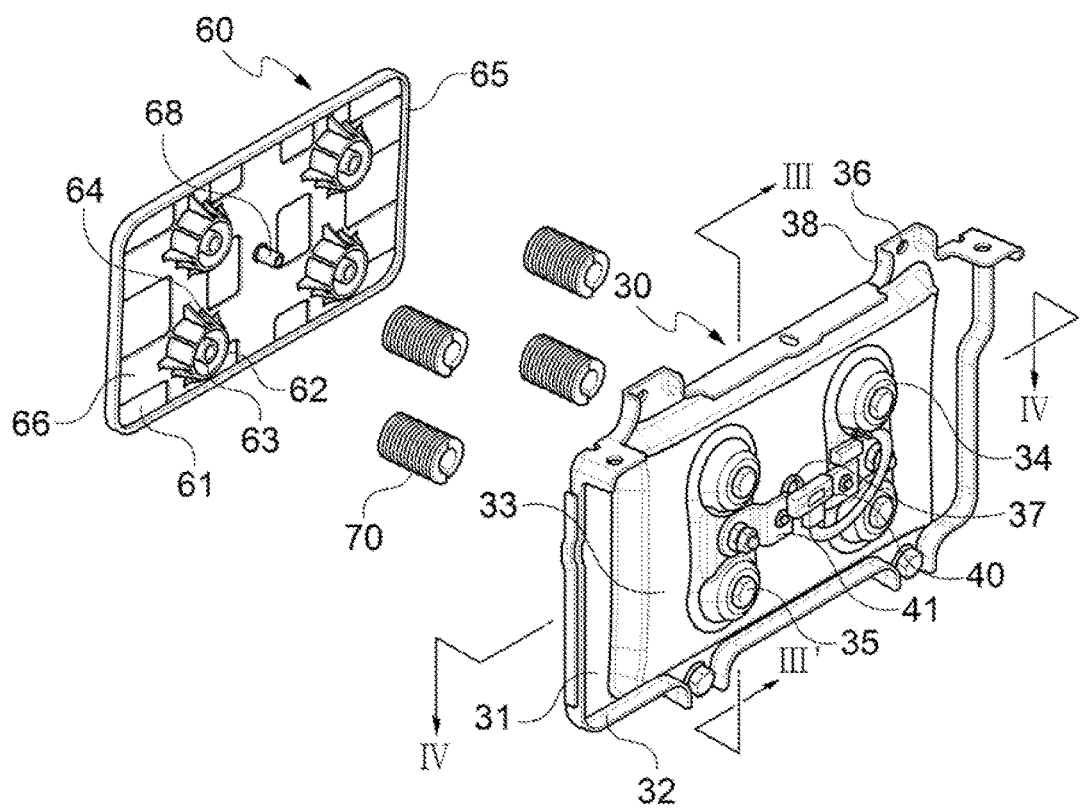
FIG. 2 is an exploded perspective view of an end plate and a movable wall of the secondary battery pack according to the embodiment of the present invention.
Figure 3:
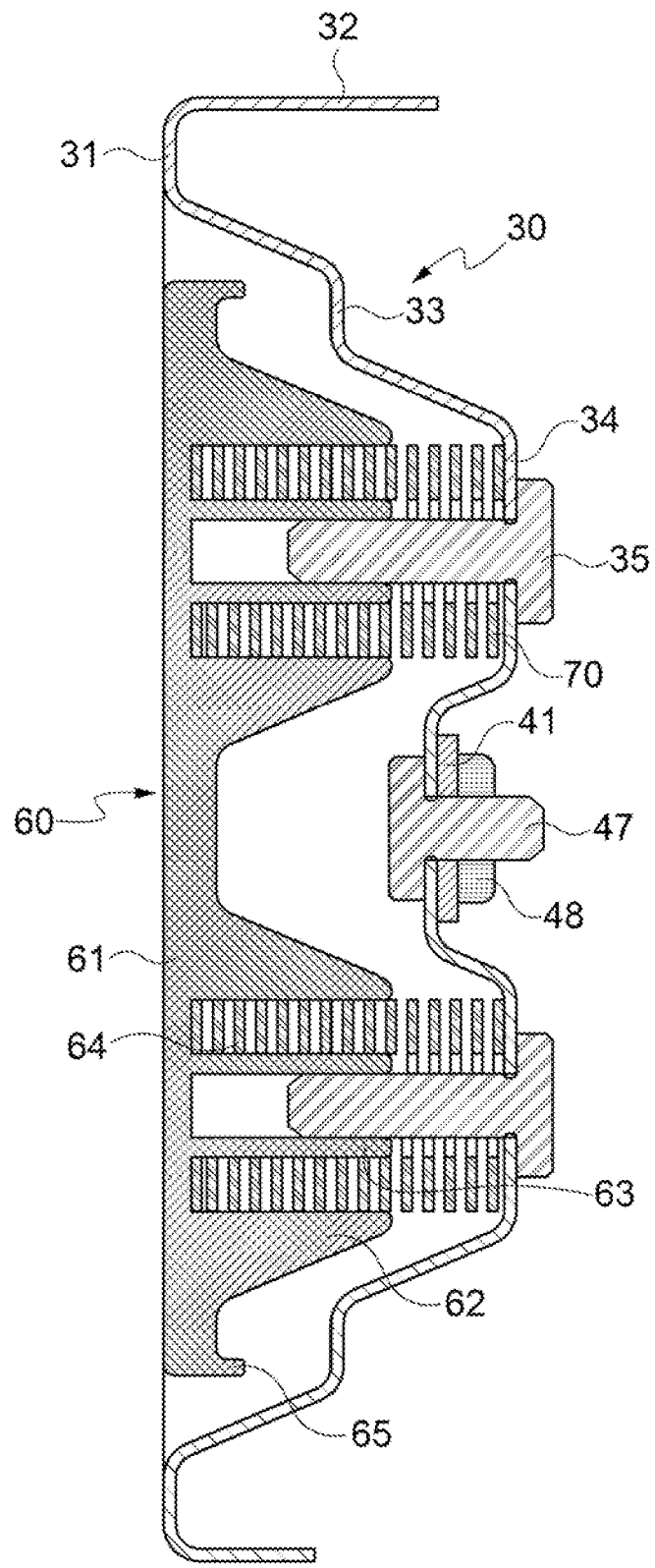
FIG. 3 is a schematic cross-sectional view illustrating a state in which the end plate, the movable wall and elastic members are assembled, taken on line III-III' of FIG. 2.
Figure 4:
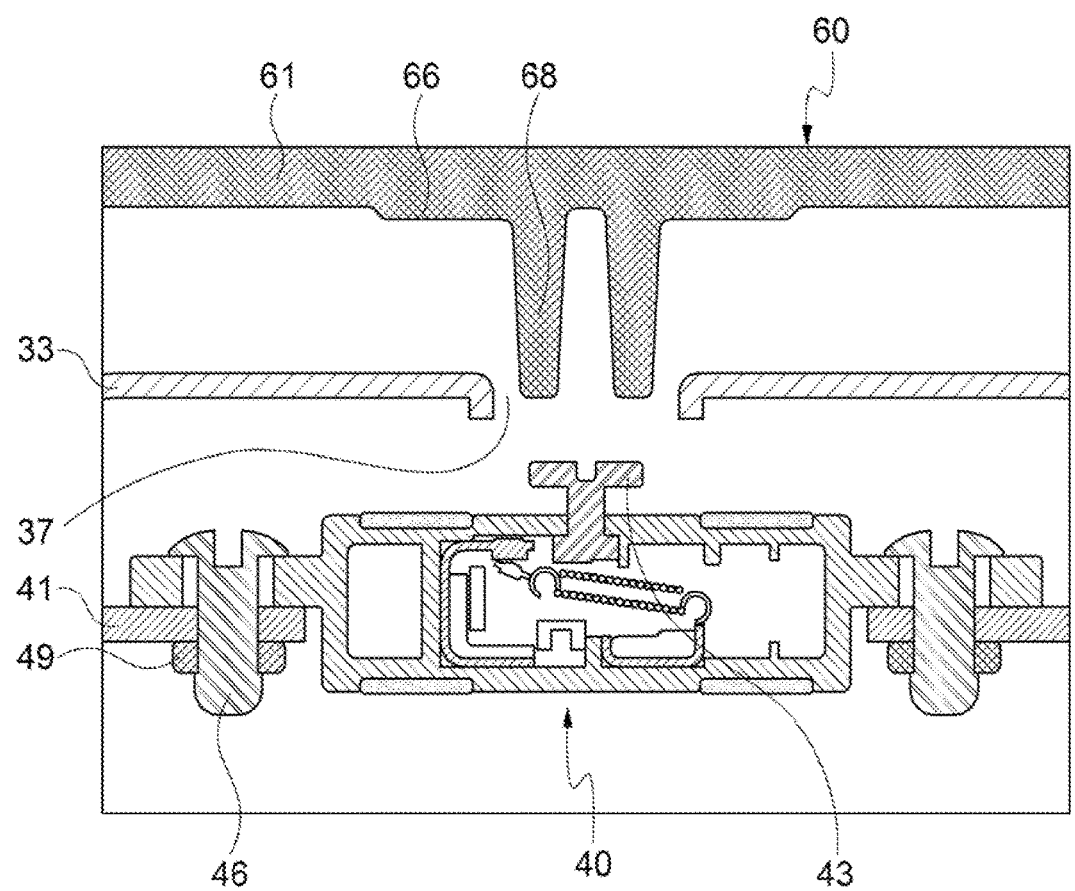
FIG. 4 is a partial cross-sectional view of the end plate and the movable wall, taken on line IV-IV of FIG. 2.

Referring to FIGS. 1 to 4: FIG. 1 is a perspective view of a secondary battery pack 10 according to an embodiment of the present invention; FIG. 2 is an exploded perspective view of an end plate 30 and a movable wall 60 of the secondary battery pack 10 according to the embodiment of the present invention; FIG. 3 is a schematic cross-sectional view illustrating a state in which the end plate 30, the movable wall 60 and elastic members 70 are assembled, taken on line III-III' of FIG. 2; and FIG. 4 is a partial cross-sectional view schematically illustrating the end plate 30 and the movable wall 60, taken on line IV-IV of FIG. 2.

As illustrated in FIGS. 1 and 2, the secondary battery pack 10 according to the embodiment of the present invention includes at least one unit cell 20, the end plates 30 which are disposed on both opposite end sides of the unit cell 20 in a longitudinal direction thereof, the movable wall 60 which is disposed between the at least one end plate 30 and one side face of the unit cell 20 so as to come into contact with the one side face of the unit cell 20, the elastic members 70 which are disposed between the movable wall 60 and the at least one end plate, and connecting bars 50 which are configured to connect the end plates 30 with each other disposed on both opposite end sides of the at least one unit cell 20.

At least one unit cell 20 is included, and when including two or more, the unit cells may be disposed so as to be laminated or arranged in a row. The unit cell 20 may be a secondary battery module including a plurality of secondary batteries (not illustrated) or the secondary battery itself. The secondary battery may be a rectangular lithium ion battery. During operating the secondary battery, gas may be generated therein to be expanded.

The end plates 30 are disposed at both opposite side faces (when two or more unit cells 20 are disposed in a row, one side face of each of unit cells 20 is present at both ends of the row) of the unit cells 20, and at least one end plate 30 of the end plates includes a convex part 33 formed at a central portion thereof so as to protrude to an outside of the end plate 30. In addition, the end plate 30 may include a base part 31 provided at a circumference of the convex part 33 in a flat shape, and a flange 32 bent from an edge of the base part 31 to an outside of the end plate 30.

As illustrated in FIG. 3, the movable wall 60 may move into the convex part 33 of the end plate 30. That is, when the unit cell is expanded by the gas generated in the unit cell 20 during operating the secondary battery pack 10, the movable wall 60 whose one surface closely comes into contact with the unit cell 20 may move into the convex part 33 while pressing the elastic members 70 to move the same to the end plate 30.

According to the above-described configuration, by the convex part 33 formed at the central portion of the end plate 30, and the movable wall 60 which is movably disposed with the elastic members 70 interposed therebetween in the convex part 33, the end plate 30 of the secondary battery pack 10 may effectively resist a bending force due to a force exerted from inside during expanding the unit cell 20, and thereby a mechanical strength or durability of the secondary battery pack 10 may be improved. Further, since the movable wall 60 moves in the convex part 33, it is possible to minimize an increase in a length of the secondary battery pack 10.

The movable wall 60 includes, as illustrated in FIG. 2, a flat plate-shaped body 61. The body 61 has a flat shape that can be housed between the unit cell 20 and the end plate 30, in particular, in the convex part 33 of the end plate 30. The movable wall 60 may play a role of pressing the unit cell 20 by the elastic members 70 at a prescribed pressure to enable the unit cell 20 to maintain performance thereof. In addition, the movable wall 60 may move to the end plate 30 in the convex part 33 during expanding the unit cell 20, thereby allowing the unit cell 20 to be expanded.

Further, the movable wall 60 may be manufactured by aluminum die-casting. In this case, since the mechanical strength which resists against an external force is increased, it is possible to prevent the movable wall 60 from being bent or deformed due to the expansion of the unit cell 20 and the force exerted by the elastic members 70 during operating the secondary battery pack 10. Therefore, sliding of guide member insertion protrusions 63 with respect to guide members 35 to be described below may be smoothly performed, and a position of the movable wall 60 with respect to the end plate 30 may be constantly maintained.

In addition, as illustrated in FIG. 2, the movable wall 60 may further include elastic member insertion protrusions 62 on one surface of the body 61, which have a hollow column shape and protrude to the end plate 30, and guide member insertion protrusions 63 which are disposed in the elastic member insertion protrusions 62 so as to protrude to the end plate 30 and have a hollow column shape. An insertion gap 64 is formed between the elastic member insertion protrusion 62 and the guide member insertion protrusion 63, and one end portion of the elastic member 70 may be inserted into the insertion gap 64 or inside of the elastic member insertion protrusion 62. The guide member 35 may be slidably inserted into the guide member insertion protrusion 63.

Further, the movable wall 60 may be provided with a frame part 66 which is formed on the body 61 in a lattice form and has a larger thickness than the other portions thereof. The elastic member insertion protrusion 62 and the guide member insertion protrusion 63 may be disposed on the frame part 66, such that the force applied to the body 61 by the elastic members 70 may be dispersed to the entirety of the body 61 through the frame part 66.

In addition, as illustrated in FIG. 3, the movable wall 60 may further include a flange 65 provided at an edge along the circumference of the body 61. Thereby, the movable wall 60 may resist the bending force that can be generated by the expansion of the unit cell 20 and the force exerted by the elastic members 70 without deformation. The flange 65 may be formed on at least one surface of the body 61 or the other surface opposite to the one surface.

Further, the movable wall 60 may include a pressing member 68 which is disposed on one surface of the body 61 facing the end plate 30. The pressing member 68 may be located at a center of the body 61 in a plan view, and a through hole 37 is formed at a portion of the convex part 33 of the end plate 30 corresponding to the pressing member 68. Thereby, when the movable wall 60 moves to the end plate 30 due to the expansion of the unit cell 20, a free end portion side of the pressing member 68 may protrude to the outside of the end plate 30, and such the protruded pressing member 68 may press a sensing part 43 of a switch 40 to be described below, thereby operating the switch 40.

Further, the pressing member 68 may be provided with a connecting part for removably connecting with each other, for example, a male thread. Therefore, during assembling the secondary battery pack 10, in a state that the elastic members 70 are installed between the movable wall 60 and the end plate 30, the free end portion of the pressing member 68 is exposed to the outside of the end plate 30 via the through hole 37, and then a screw is screwed with the male thread of the connecting part, such that the three members (i.e., the movable wall 60, the elastic members 70 and the end plate 30) may be maintained with being integrally connected to each other. In addition, a length extension part (not illustrated) may be connected with the connecting part, that is, the male thread. The length extension part may be formed in a shape, for example, similar to the pressing member 68, and may have a groove formed at one end portion. Herein, it may be configured in such a manner that a female thread is formed on an inner surface of the groove, and the male thread formed on the free end portion of the pressing member 68 is fastened to the female thread. In this regard, the length extension part having different lengths may be provided. According to the above-described configuration, by attaching the length extension part having a proper length to the pressing member 68, an operation time of the switch 40 may be controlled, or it is possible to easily cope with even if a specification of the unit cell 20 forming the secondary battery pack 10 is changed.

In addition, the pressing member 68 may be integrally formed with the body 61 of the movable wall 60. Also, a groove is formed in the body 61, and the pressing member 68 may be separately connected thereto through the groove. In this case, the pressing member 68 having different lengths may be connected to the body 61, such that it is possible to connect the pressing member 68 having a required length to the body 61 depending on a change in a specification, etc. of the secondary battery pack 10.

The elastic member insertion protrusions 62 and the guide member insertion protrusions 63 on the movable wall 60 may be point-symmetrically positioned about the pressing member 68 which is disposed at the center of the body 61. In the present embodiment, as illustrated in FIG. 2, four pairs of the elastic member insertion protrusions 62 and the guide member insertion protrusions 63 are point-symmetrically provided about the pressing member 68 on one surface of the rectangular body 61, but it is not limited thereto.

The movable wall 60 having the above-described configuration may move back and forth with respect to the end plate 30 while being guided by the guide members 35 which protrude from inside of the end plate 30 corresponding to the guide member insertion protrusions 63. Accordingly, even if a force applied on a surface of the movable wall 60 facing the unit cell 20 due to the expansion thereof is exerted to a portion out of the center of the body 61, the movable wall 60 may move in a constant, that is, as illustrated in FIG. 3, in a state parallel to the end plate 30 without being tilted or rolled with respect to the end plate 30. Therefore, the pressing member 68 of the movable wall 60 is accurately inserted into the through hole 37 to press the sensing part 43 of the switch 40 to be described below, such that it is possible to accurately cope with the expansion state of the unit cell 20.

The end plate 30 may further include additional protruded parts 34 formed so as to protrude outward of the end plate 30 at a portion of the convex part 33 corresponding to the elastic member insertion protrusions 62 and the guide member insertion protrusions 63. The additional protruded parts 34 may, as illustrated in FIG. 3, house the elastic member insertion protrusions 62 during when the movable wall 60 moves to the end plate 30 by the expansion of the unit cell 20.

Further, the end plate 30 may include the guide members 35 which protrude from the inside of the additional protruded part 34 to the movable wall 60. As illustrated in FIG. 3, the guide member 35 may be slidably inserted into the guide member insertion protrusion 63, and allow the movable wall 60 to move back and forth without being tilted or inclined with respect to the end plate 30. Accordingly, even if a size of the through hole 37 of the end plate 30 is small, the pressing member 68 of the movable wall 60 may be accurately inserted into the through hole 37, and may operate the switch 40 at a desired time to be described below, or in a predetermined operating state of the unit cell 20.

The end plate 30 may further include the switch 40 attached on an outer surface of the end plate 30. The switch 40 may be a non-return type, such that, even if the unit cell 20 is contracted after expansion, it is possible to prevent re-operation of the secondary battery pack 10. The switch 40 may, for example, include a runaway arresting device (RAD) switch as illustrated in FIG. 4. The RAD switch 40 may be configured in such a manner that, when the sensing part 43 thereof is pressed by the pressing member 68, a relay coil of the secondary battery pack 10 is separated due to an increase in an internal contact resistance, thereby cutting off the electrical connection of the secondary battery pack 10.

In addition, the end plate 30 may further include a bracket 41 for attaching the switch 40 to the outer surface of the end plate 30. As illustrated in FIG. 3, the bracket 41 may be attached, for example, by a bolt 47 which protrudes from the inside of the end plate 30 to the outside and a nut 48 to be fastened thereto. As illustrated in FIG. 4, the switch 40 may be fixed to the bracket 41 by a screw 46 and a nut 49 so that the sensing part 43 of the switch 40 corresponds to the through hole 37.

Further, as illustrated in FIG. 2, the end plate 30 may include connecting parts 38 formed at the edge of the base part 31, for example, which can be connected with the connecting bars 50. The end plate 30 may be fixedly connected with the connecting bars 50, for example, by bolts fastened into through holes 36 formed in the connecting parts 38.

The elastic members 70 disposed between the at least one end plate 30 and the movable wall 60 of the secondary battery pack 10 may be, for example, a compression coil spring, as illustrated in FIGS. 2 and 3. One end portion of the elastic member 70 is inserted inside of the elastic member insertion protrusion 62 of the movable wall 60, or into the insertion gap 64 between the elastic member insertion protrusion 62 and the guide member insertion protrusion 63, and the other end portion thereof may closely come into contact with an inner surface of the end plate 30, for example, with the inside of the additional protruded part 34.

The connecting bars 50 may have, for example, a rectangular cross section, and may be provided with threaded holes into which the bolts can be fixed. Two connecting bars 50 may be respectively disposed at the upper and lower portions of the secondary battery pack 10, and connected to the connecting parts 38 of the end plate 30, so as to combine the unit cell 20 disposed between the end plates 30. Further, brackets 52 may be disposed between end parts of the connecting bars 50 and the connecting part 38.

The unit cell 20 may be provided with cooling fins 80 on the upper portion thereof to emit heat generated from the unit cell 20 to the outside. The unit cell 20 may be provided with a flow passage (not illustrated) therein, in which a medium for absorbing the heat generated from the unit cell 20 and transferring it to the cooling fins 80 can be flowed.

In the secondary battery pack 10 according to the embodiment of the present invention having the above-described configuration, for example, if the unit cell 20 is expanded exceeding a predetermined level due to overcharging, etc., the movable wall 60 moves into the convex part 33 of the end plate 30 while pressing the elastic members 70. In this case, the pressing member 68 of the movable wall 60 protrudes via the through hole 37 and presses the sensing part 43 of the switch 40 to operate the switch 40, such that an operation such as charging of the secondary battery pack 10 may be stopped, and thereby the unit cells 20 of the secondary battery pack 10 may be protected.

While the present invention has been described with reference to the preferred embodiments, it will be understood by those skilled in the related art that various modifications and variations may be made therein without departing from the scope of the present invention as defined by the appended claims.

Further, substituting or modifying the components illustrated in the present invention to publicly known technical elements that perform a similar function will be apparent to those skilled in the related art, or may be included in technical common knowledges.

Accordingly, the scope of the present invention should not be limited to the above-described embodiments, and may affect the spirit and equivalent scope shown in the following claims.

What is claimed is:

1. A secondary battery pack comprising:
   at least one unit cell including a secondary battery or a secondary battery module;
   at least one end plate which is disposed on at least one side of both opposite end sides of the unit cell;
   a movable wall which is disposed between the at least one end plate and one side face of the unit cell; and
   an elastic member which is disposed between the at least one end plate and the movable wall to apply a compression force to the one side face of the unit cell through the movable wall,
   wherein the at least one end plate includes:
   a convex part which is formed thereon so as to protrude in an opposite direction of the one side face of the unit cell, so that, when the movable wall moves to the end plate due to the unit cell being expanded while pressing the elastic members, the movable wall is housed therein,
   wherein when the movable wall moves to the end plate due to the unit cell being expanded while pressing the elastic members, the movable wall moves into the convex part.

2. The secondary battery pack according to claim 1, wherein the movable wall includes:
   a flat plate-shaped body; and
   one or more hollow column-shaped elastic member insertion protrusions which are formed on a surface facing the at least one end plate of the body,
   wherein the at least one end plate further includes:
   an additional protruded parts which is formed thereon so as to protrude in the opposite direction of the one side face of the unit cell corresponding to the elastic member insertion protrusions, so that, when the movable wall moves to the at least one end plate due to the unit cell being expanded while pressing the elastic members, the elastic member insertion protrusions are inserted therein, and
   one end portion of the elastic member is inserted inside of the elastic member insertion protrusion, and the other end portion of the elastic member is positioned in the additional protruded part.

3. The secondary battery pack according to claim 1, wherein the at least one end plate further includes:
   a guide member which protrudes from the convex part to the movable wall,
   wherein the movable wall includes:
   a flat plate-shaped body; and
   one or more hollow column-shaped guide member insertion protrusions which are formed on a surface facing the at least one end plate of the body,
   wherein the guide member is slidably inserted into the guide member insertion protrusions.

4. The secondary battery pack according to claim 2, wherein the secondary battery pack further includes:
   a switch which is attached on an outer surface of the at least one end plate,
   the movable wall includes:
   a pressing member which is formed on the surface facing the at least one end plate of the body,
   the at least one end plate includes:
   a through hole which is formed therein so that, when the movable wall moves to the at least one end plate due to the unit cell being expanded while pressing the elastic members, the pressing member protrudes to an outside of the at least one end plate,
   wherein the switch is positioned in the at least one end plate so that the pressing member protrudes via the through hole to operate the switch.

5. The secondary battery pack according to claim 4, wherein the switch is a non-return type switch.

6. The secondary battery pack according to claim 4, wherein the pressing member is disposed at a center of the movable wall, and
   a plurality of elastic member insertion protrusions or a plurality of guide member insertion protrusions are disposed so as to be point-symmetric about the pressing member.

7. The secondary battery pack according to claim 4, wherein the pressing member has a connecting part formed at a free end portion thereof.

8. The secondary battery pack according to claim 4, wherein the pressing member is separately connected to the body.

9. The secondary battery pack according to claim 1, wherein the movable wall is formed by aluminum die-casting.

10. The secondary battery pack according to claim 2, wherein the movable wall has a frame part which is formed on the body thereof in a lattice form and has a larger thickness than the other portions thereof, and
    the elastic member insertion protrusions are disposed on the frame part.

11. The secondary battery pack according to claim 3, wherein the movable wall has a frame part which is formed on the body thereof in a lattice form and has a larger thickness than the other portions thereof, and
    the guide member insertion protrusions are disposed on the frame part.

* * * * *